United States Patent [19]
Knudsen

[11] 3,890,111
[45] June 17, 1975

[54] TRANSFER LINE BURNER SYSTEM USING LOW OXYGEN CONTENT GAS

[75] Inventor: Christian W. Knudsen, Seabrook, Tex.

[73] Assignee: Exxon Research and Engineering Company, Linden, N.J.

[22] Filed: Feb. 21, 1974

[21] Appl. No.: 444,613

[52] U.S. Cl. .................. 48/197 R; 48/202; 48/206; 201/31; 208/164; 252/417; 431/3; 432/215
[51] Int. Cl. ............................................. C10j 3/12
[58] Field of Search .......... 48/197 R, 202, 203, 206, 48/210; 201/9, 38, 31; 252/417; 208/164; 432/215; 431/3

[56] References Cited
UNITED STATES PATENTS

| | | | |
|---|---|---|---|
| 2,374,660 | 5/1945 | Belchetz et al. | 252/417 |
| 2,534,728 | 12/1950 | Nelson et al. | 201/31 X |
| 2,694,623 | 11/1954 | Welty et al. | 48/197 |
| 2,713,590 | 7/1955 | Palmer et al. | 48/206 |
| 2,741,549 | 4/1956 | Russell | 48/206 |
| 3,542,532 | 11/1970 | Johnson et al. | 48/197 R |
| 3,647,714 | 3/1972 | White | 252/417 |
| 3,661,799 | 5/1972 | Cartmell | 252/417 |
| 3,785,782 | 1/1974 | Cartmell | 252/417 |
| 3,807,090 | 4/1974 | Moss | 48/211 |

*Primary Examiner*—S. Leon Bashore
*Assistant Examiner*—Peter F. Kratz
*Attorney, Agent, or Firm*—James E. Reed

[57] ABSTRACT

Carbonaceous solids are heated in a transfer line burner during coal gasification or a similar process by introducing a dense phase stream of the solids into the lower end of the burner in the presence of a substantially inert gas; injecting sufficient gas having a molecular oxygen content less than that of air, normally between about 1 and about 15% by volume, into the dense phase stream near the bottom of the burner to promote a transition from dense phase to dilute phase flow and initiate the combustion of carbon; and withdrawing flue gas and heated solids overhead from the burner. The use of a gas of relatively low molecular oxygen content alleviates ash fusion problems and related difficulties.

10 Claims, 1 Drawing Figure

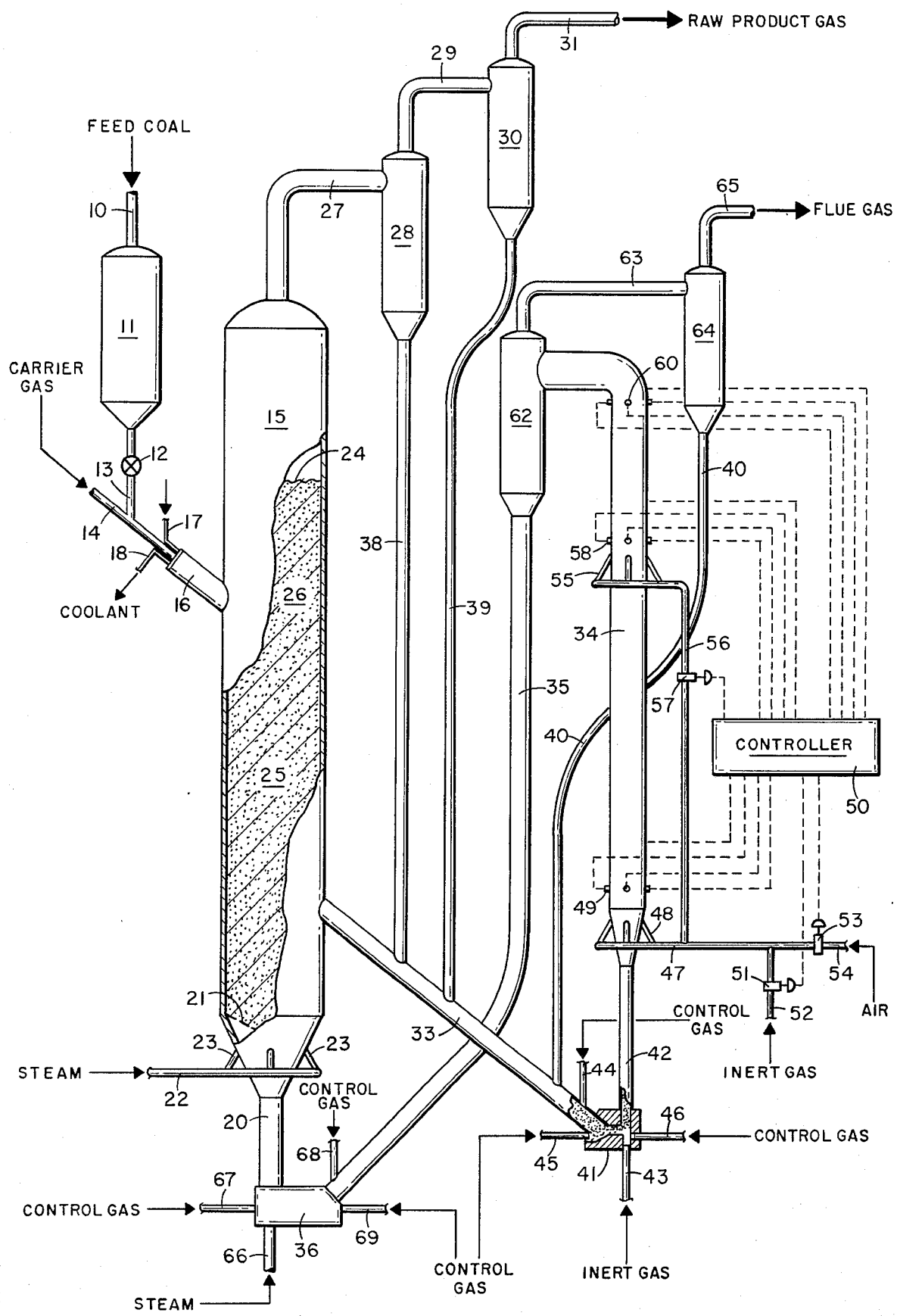

3,890,111

TRANSFER LINE BURNER SYSTEM USING LOW OXYGEN CONTENT GAS

BACKGROUND OF THE INVENTION

1. Field of the Invention

This invention relates to coal gasification and similar processes and is particularly directed to processes of this type in which the exothermic heat required is generated by burning carbonaceous solids in a transfer line burner.

2. Description of the Prior Art

The production of synthesis gas composed primarily of carbon monoxide and hydrogen by the reaction of steam with coal char or similar carbonaceous solids is an endothermic process which requires substantial quantities of heat. One of the more attractive methods for providing this heat involves the use of a fluidized bed reaction vessel and a transfer line burner. Char particles or similar carbonaceous solids are continuously withdrawn from the fluidized bed reaction vessel, passed upwardly through the transfer line burner, and then returned to the fluidized bed. Heat is generated within the burner by introducing sufficient air near the lower end of the burner to promote the combustion of a limited amount of the carbon present in the solids. The resulting gases and entrained solids are separated at the upper end of the burner, the gas stream being further processed for the removal of fines and the recovery of heat and the hot solids being returned to the fluidized bed reaction vessel to provide heat and furnish carbon for the process. Experience has shown that this use of a transfer line burner has important advantages over systems in which oxygen is injected directly into the gasifier in order to supply the heat required.

Despite the advantages of using a transfer line burner as described above, pilot plant tests have shown that such a system may present serious problems. Under the conditions which exist as the hot char particles move upwardly within the burner, the oxygen present in the injected air reacts with carbon very rapidly. Temperatures increase in the vicinity of the injection nozzles and may exceed the fusion temperatures of the ash present in the char particles. If this occurs, plugging of the nozzles and the accumulation of deposits on the burner walls are apt to take place. Efforts to avoid these problems by the use of special nozzles, cooling coils and the like have in the past been only partially successful.

SUMMARY OF THE INVENTION

The present invention provides a method for controlling the operation of transfer line burners used in coal gasification processes and similar operations which at least in part alleviates the difficulties outlined above. In accordance with the invention, it has now been found that the operation of such burners can be effectively controlled and significantly improved by introducing a dense phase stream of char particles or similar carbonaceous solids into the lower end of the transfer line burner in the presence of an inert gas substantially free of molecular oxygen, injecting a gas having a molecular oxygen content between about 1 and 15 volume percent near the lower end of the burner in sufficient quantity to effect a transition from dense phase to dilute phase flow and initiate the combustion of carbon as the particles move upwardly within the burner, and withdrawing hot particles and combustion gases from the upper end of the transfer line burner. Laboratory studies and pilot plant tests have demonstrated that the use of a gas of relatively low oxygen content, normally less than about 15% by volume and preferably less than about 10% by volume, permits controlled combustion of the carbon present in the particles and generation of the heat required with the localized overheating and ash fusion problems which are frequently encountered in burner operations in which air is used.

The preferred oxygen content for a particular operation carried out in accordance with the invention will depend in part on the burner configuration and upon the chemical and physical properties of the char or other carbonaceous solids, the gas velocity, the burner operating pressure and other variables and can be readily determined by monitoring the temperature at one or more locations within the burner and adjusting the oxygen content of the gas as necessary. Although any of a variety of different gas compositions may be used, it is generally preferred to employ a mixture of air with sufficient recycle flue gas to give the desired oxygen content.

As indicated above, the method of the invention alleviates difficulties due to localized overheating and ash fusion during transfer line burner operations and thus facilitates the sustained operation of coal gasification plants and similar processes using transfer line burners for much longer periods than might otherwise be feasible. It also permits smoother burner operation, results in more efficient combustion, permits better carbon utilization, and has other advantages over earlier systems. These advantages provide economic incentives for use of the method.

BRIEF DESCRIPTION OF THE DRAWING

The single FIGURE in the drawing is a schematic flow sheet of a process for the production of a methane-rich gas from coal which is carried out in accordance with the invention.

DESCRIPTION OF THE PREFERRED EMBODIMENTS

The drawing depicts a coal gasification process in which coal or a similar carbonaceous solid is devolatilized and char is hydrogasified in the presence of synthesis gas in the upper portion of a fluidized bed reaction vessel to produce a product gas having a methane content of about 10 volume percent or higher and steam is reacted with char in the lower portion of the fluidized bed reaction vessel to generate the required synthesis gas. The solid feed material employed in the process may be a bituminous coal, subbituminous coal, lignite or similar carbonaceous material which will react with steam at high temperatures to form char but will preferably be a bituminous or lower rank coal. This solid feed is introduced into the system through line 10 from a preparation plant or similar facility, not shown, in which the coal or other feed material is crushed, dried and screened, or from a storage facility which does not appear in the drawings. To facilitate the handling of this solid feed material in a fluidized state, the material is introduced into the system in a finely divided condition, normally less than about 8 mesh on the Tyler Screen Scale in size.

Processes for the gasification of coal and similar materials are normally most efficient at elevated pressures and hence the process shown in the drawing is generally operated at a pressure within the range between about 50 psig and about 2000 psig. The coal or other feed material introduced into the system through line 10 is fed into closed vessel 11, from which it is discharged through star wheel feeder or similar device 12 into line 13 at the system operating pressure or at a slightly higher pressure. Parallel lock hoppers, pressurized hoppers, aerated standpipes arranged in series, or other apparatus may be employed in addition to or in lieu of the apparatus shown in order to raise the input coal stream to the required pressure level. Equipment which is suitable for the handling of coal and other finely divided solids at elevated pressures has been described in the patent literature and elsewhere and will therefore be familiar to those skilled in the art. Such equipment is available from various manufacturers of materials handling equipment.

A stream of carrier gas, normally steam, recycle product gas, flue gas or a similar inert gaseous fluid, is introduced into the system through line 14 in order to permit the entrainment of coal particles or other solid feed material from line 13 and introduction of the solids into gasifier 15. The use of recycled product gas avoids any appreciable reduction of the hydrogen concentration in the gasifier and generally improves the methane yields. For this reason, the use of recycled product gas is normally preferred. This gas stream is introduced into the system at a pressure between about 50 and about 2000 psig, depending upon the pressure at which gasifier 15 is operated and upon the solid feed material employed, and is preferably injected at a temperature within the range between about 300° F. and about 600° F., again depending upon the pressure, the particular feed material selected and other considerations. For the gasification of bituminous coals, the use of carrier gas input temperatures within the range between about 400° and about 550° F. is generally preferred. The coal particles introduced through line 13, preferably less than about 20 mesh in size on the Tyler Screen Scale, are suspended in the input carrier gas fed through line 14 in a ratio between about 0.2 and about 2.0 pounds of coal per pound of carrier gas. The optimum ratio for a particular system will depend in part upon the coal particle size and density, the molecular weight of the gas employed, the temperature of the coal and input stream and other factors. In general, ratios between about 0.5 and about 1.5 pounds of coal per pound of carrier gas are preferable. The resultant stream of carrier gas and entrained coal or similar feed particles is then fed through a fluid-cooled nozzle 16 into the gasifier. The coolent employed, which will normally be low pressure steam but may also be water or other fluid, can be introduced into the nozzle through line 17 and withdrawn through line 18. Alternatively, the cooling gas or other fluid can in some cases be injected into the gasifier around the injected stream of solids to control the rate at which the solids are heated on entry into the fluidized bed contained in gasifier 15.

The gasifier employed in the process shown comprises a refractory-lined vessel containing a fluidized bed of char particles introduced into the lower part of the vessel through inlet line 20. This inlet line extends upwardly through the bottom of the gasifier to a point above grid or similar distribution device 21. Steam for maintaining the char particles in a fluidized state and reacting with the char to produce a synthesis gas containing substantial quantities of hydrogen and carbon monoxide is introduced into the gasifier below the grid through manifold 22 and injection nozzles 23. In the installation shown, four nozzles are provided at 90° intervals about the periphery of the gasifier but a greater or lesser number may be employed if desired. The steam introduced through the nozzles will normally be fed into the system at a pressure slightly in excess of the gasifier operating pressure and at a corresponding temperature. From about 0.5 to about 2.0 pounds of steam per pound of coal feed is normally adequate. The upflowing steam and suspended char particles form a fluidized bed which extends upwardly in the gasifier to a level above that at which the coal particles are introduced through nozzle 16. Although only one coal feed nozzle is shown, it will be understood that a plurality of nozzles may in some cases be used. The upper surface of the fluidized bed is indicated in the drawing by reference numeral 24.

The steam gasification zone in the gasifier shown extends between grid 21 and the level at which the coal particles are injected into the system through nozzle 16 and is indicated generally by reference numeral 25. Here the injected steam reacts with carbon in the hot char particles to form synthesis gas in accordance with the reaction: $H_2O + C \rightarrow H_2 + CO$. Other reactions take place, of course, but this is the primary reaction. At the point of steam injection near the lower end of the gasifier, the hydrogen concentration in the gaseous phase of the fluidized bed will normally be substantially zero. As the steam moves upwardly through the fluidized char particles, it reacts with the hot carbon to produce synthesis gas and the hydrogen concentration in the gaseous phase therefore increases. The temperature in the steam gasification zone will generally range between about 1450° and about 1800° F. Depending upon the particular feed material and the particle sizes employed, the gas velocities in the fluidized bed will generally fall within the range between about 0.2 and about 2.0 feet per second.

The hydrogasification zone in the system shown in the drawing extends in general between the level at which the feed coal stream is introduced through nozzle 16 and the upper surface of the fluidized bed and is indicated generally by reference numeral 26. Here the feed coal is devolatilized, at least part of the volatile matter thus liberated reacts with hydrogen generated in the steam gasification zone below to produce methane, and methane is produced by the reaction of hydrogen with carbon in accordance with the equation: $C + 2H_2 \rightarrow CH_4$. Other reactions also occur. It is generally preferred that the feed coal stream be introduced into the gasifier at a point where the hydrogen concentration in the gas phase is in excess of about 20% by volume, preferably between about 30 and about 50% by volume, and that the upper surface of the fluidized bed be located sufficiently above the nozzle to provide about 4 seconds or more of residence time for the gas in contact with the fluidized solids in the hydrogasification zone. A residence time between about 10 and about 20 seconds is normally preferred. The optimum conditions within the fluidized bed will vary somewhat with different types and grades of feed coal. Higher rank coals generally require somewhat more severe reaction conditions and longer residence times to obtained high methane yields than do coals of lower rank.

The gases produced by the reactions occurring within the gasifier move upwardly from the upper surface of the fluidized bed and carry entrained fines with them. These gases may be passed through a cyclone separator or similar device located in the upper portion of the gasifier above the bed or may instead be withdrawn from the gasifier through overhead line 27 and passed to an external cyclone separator or comparable device 28 where the larger particles are removed from the gas stream. The gases from the separator are withdrawn through line 29 and will normally contain entrained fines too small to be taken out by separator 28. This gas may therefore be passed to a second cyclone separator or similar unit 30 for the removal of additional fine particles. The raw product gas is withdrawn overhead from this second separator through line 31 and may be passed to conventional downstream facilities for cooling, for the removal of water and any additional entrained solids, for treatment to take out carbon dioxide and sulfur compounds, and the like. If desired, the treated gas can then be passed through a catalytic shift conversion unit to adjust the hydrogen-to-carbon monoxide ratio and then introduced into a methanation unit to increase the amount of methane and thus raise the B.t.u. content of the gas. All of these downstream gas treating and processing steps may be carried out in a conventional manner and will therefore be familiar to those skilled in the art.

The reactions which take place within the gasifier are highly endothermic and require that substantial quantities of heat be provided. This is done by continuously withdrawing char particles from the lower part of the fluidized bed by means of line 33, passing these particles through a transfer line burner 34, and returning hot particles through line 35, injector 36 and gasifier inlet line 20. The solids withdrawn from the fluidized bed in the gasifier move downwardly through line 33 as a dense phase stream. Fines separated from the product gas in cyclone separators 28 and 30 are introduced into this stream through standpipes 38 and 39. In similar fashion, fines recovered from the flue gas as described hereafter are injected into the dense phase stream in line 33 through standpipe 40. The solids then enter transfer line burner injection device 41 where they are first accelerated and then carried upwardly into the burner inlet line 42 by a stream of inert gas introduced through line 43. This inert gas will normally be substantially free of molecular oxygen and may be recycled flue gas, nitrogen, or the like. The movement of the solids stream through the injection device is controlled by means of control gas introduced through lines 44 and 45. Line 46 may also be employed for this purpose but is not always essential. This control gas will normally be an inert gas similar to that introduced through line 43 but steam may also be used in some cases. The solids move upwardly through line 42 in dense phase flow and enter the lower end of the burner with a velocity on the order of from about 0.5 to about 1.5 feet per second or more, depending upon the particle size, the amount of gas employed and other factors. Here an oxygen-containing gas with a molecular oxygen content less than that of air, preferably less than about 15% by volume, is introduced into the burner through line 47 and gas injection nozzles 48. The gas employed will normally be a mixture of air and recycle flue gas. The injection nozzles are spaced about the periphery of the burner in order to obtain intimate mixing of the gas with the upflowing solids. Although four nozzles spaced at 90° intervals are used in the particular system shown, a greater or lesser number may in some cases be employed. The injection of the gas into the solids stream further accelerates the solids sufficiently to produce a transition from dense phase to dilute phase flow and initiates combustion of the hot solids, which are normally at a temperature only slightly below that of the lower section of the fluidized bed in gasifier 15.

Oxygen in the injected gas reacts with carbon on the surfaces of the particles to form carbon dioxide and carbon monoxide. The heat liberated as combustion takes place serves to raise the temperature of the upflowing solids stream from an initial level of from about 1450° to to about 1800° F. to a final level between about 1500° and about 1950° or higher. The amount of carbon which must be burned to generate the heat and the quantity of oxygen that will be required for this purpose will depend upon the quantity and type of solids being handled, the combustion efficiency, the heat losses which occur within the system and other factors. Similarly, the quantity of oxygen-containing gas which must be introduced into the system to produce this heat is governed in part by the molecular oxygen content of the gas stream. These can all be readily calculated. In general, from about 0.025 to about 0.35 pound of gas per pound of char being circulated will be needed. The lower the oxygen content of the gas, the more gas that will be required.

The amount of gas which is injected into the burner through nozzles 48 must be sufficient to produce the necessary transition from dense phase to dilute phase flow. At the same time, the gas velocities in the upper part of the burner must be low enough to avoid excessive attrition and degradation of the char particles as they move upwardly through the system. Because of the formation of gaseous combustion products and the increase in temperature due to combustion, the volume increases as the gases move upwardly within the burner. To compensate for this increase in volume and avoid accessive velocities near the upper end of the burner, the burner may be constructed so that it is somewhat larger at the upper end than at the lower end.

As indicated earlier, the preferred oxygen content of the gas fed to the burner will depend in part on the burner configuration and upon the chemical and physical properties of the char or other carbonaceous solids, the gas velocity, the burner operating pressure and other variables. To insure operation at high efficiency and obtain maximum benefits from the invention, it is therefore preferred to monitor the burner wall temperatures. As indicated in the drawing, this may be done by means of thermocouples or similar devices installed in wells 49 at strategic locations about the burner. Temperatures in the vicinity of the gas injection nozzles where deposits are most likely to be formed and ash fusion difficulties are most frequently encountered generally have to be kept below about 2000° F. This temperature may vary to some extent depending upon the ash constituents in the coal employed but temperatures significantly higher than this generally cannot be tolerated. Thermocouple wells 49 are therefore located in the burner wall just above each of the injection nozzles 48 and are connected to a suitable recorder and controller 50, which may be of commercial design. This controller is in turn electrically or hydraulically connected to an electrical or hydraulic valve 51 in inert gas inlet line 52 and to a similar valve 53 in air inlet line 54. The controller is programmed to increase the amount of inert gas fed into the system through line 52 and decrease the amount of air admitted through line 54, keeping the total volume constant, if the temperatures sensed by the thermocouples in wells 49 exceed predetermined maximum values. Similarly, the controller may be programmed to reduce the amount of inert gas and increase the amount of air if the temperatures fall below a predetermined minimum value. This thus permits regulation of the composition of the gas stream injected through nozzles 48 to maintain high operating efficiencies and yet avoid problems due to localized overheating and ash fusion. In lieu of the system shown, a system in which the gas composition to each injection nozzle is separately regulated may be employed if desired. Sensing systems other than thermocouples, optical pyrometers for example, may also be used.

Although not always essential, it is often advantageous to introduce the oxygen-containing gas into the transfer line burner at two or more different levels in the burner. As indicated earlier, studies have shown that the oxygen injected into the burner is consumed very rapidly. By providing a second set of nozzles 55 at a higher elevation in the burner where essentially all of the oxygen injected earlier has been consumed, better oxygen utilization and more effective control of the burner temperatures can often be obtained. Nozzles 55 are supplied with gas through line 56 which may be provided with an electrically or hydraulically actuated value 57 for controlling the quantity of gas admitted to the upper set of nozzles. Valve 57 is actuated by controller 50 in response to changes in temperature detected by one or more thermocouples which are located in thermocouple wells 58 and connected to the controller. If the temperature in the vicinity of the upper nozzles becomes excessive, the amount of gas passing through line 56 can be reduced by throttling valve 57. Similarly, if the temperature falls below a predetermined level, the amount of gas admitted can be increased to produce an increase in temperature. Injection of the oxygen-containing gas at two levels reduces the amount of oxygen which must be supplied near the bottom of the burner and thus aids in alleviating overheating and ash fusion problems. It is generally also advantageous to monitor the temperature at the upper end of the transfer line burner to ensure that the char particles leaving the burner are at the required temperature. Thermocouples located in thermocouple wells 60 may be provided for this purpose. These thermocouples are connected to controller 50 and the controller may be programmed to increase the amount of gas introduced at one or both sets of nozzles in the event that the particle exit temperatures are too low. It will be understood, of course, that the use of a controller and electrically or hydraulically actuated valves is not always essential and that in some cases the volume and composition of the gas injected into the burner can be regulated manually.

The total quantity of oxygen introduced into the transfer line burner as described above should normally be sufficient to permit the combustion of enough carbon to affect a temperature rise in the unburned char particles of from about 50° to about 300° F., preferably about 200° F. The total amount of oxygen which will be needed and the volume of oxygen-containing gas which will be required under normal operating conditions can be computed. In general, it is normally preferred to inject the oxygen-containing gas at a rate between about 0.025 and 0.35 pound per pound of char circulated through the burner. The total residence time of the char solids within the burner will generally range between about 0.3 and about 5.0 seconds.

The gases and hot suspended solids leaving the upper end of the transfer line burner flow into a cyclone separator or similar device 62 where the gas is separated from the larger entrained solid particles. These particles are then returned through line 35 for reintroduction into the gasifier. The combustion gases are taken off overhead through line 63 and passed to a second cyclone separator or similar device 64 for the removal of fines. The fines are conveyed downwardly through standpipe 40 for injection into the dense phase solids stream in line 33. The gas is taken overhead through line 65 and may be passed through additional separators, scrubbers and further treating or processing equipment before being discharged as flue gas. As indicated above, a portion of the flue gas may be recycled through lines not shown in the drawing for use at various points in the process.

The hot solids returned from the transfer line burner through line 35 are fed into gasifier injection device 36, which may be similar in design to the burner injection device 41. Steam is introduced into the lower end of the injection device through line 66 to carry the hot solid particles upwardly into the gasifier through gasifier inlet line 20. Control gas is introduced through lines 67, 68 and 69 to control the movement of solids through the injection device and avoid plugging and other difficulties.

The nature and object of the invention are further illustrated by the results of the series of test runs carried out in a pilot plant transfer line burner into the lower end of which a dense phase stream of hot coal char particles was introduced in the presence of an inert gas. Air was injected into the bottom of the burner to carry the char particles upwardly in dilute phase flow and provide the oxygen required for the combustion of a portion of the carbon. The hot gases and entrained particles carried overhead from the burner were separated by means of cyclone separators and recovered. The burner was provided with thermocouples at intervals along its length to permit monitoring of the gas-solids temperatures at critical points in the unit. The initial runs were made at atmospheric pressure and combustion temperatures in the range between about 1400° and about 1800° F. During operation it was found that the temperature near the injection point quickly reached levels above the ash fusion temperature of between 2000° and 2100° F. and that this led to the formation of ash deposits on the burner wall. Char particles tended to adhere to these deposits and burn in the presence of the injected air. This resulted in severe localized overheating.

Following the initial runs described above, additional runs were carried out in a transfer line burner equipped with thermocouples for monitoring and recording the burner temperatures at critical points and with means for blending and injecting mixtures of air and inert gas in lieu of air alone. About 35 runs were made with average burner temperature between about 1250° and about 1800° F. and at atmospheric pressure and 30 psig. Gas compositions containing from about 5% to about 21% molecular oxygen by volume were used. The gas velocities, residence times, char feed rates, and oxygen-to-carbon ratios were varied during these runs. It was found that the use of air alone frequently resulted in the formation of ash deposits and plugging of the burner, particularly at elevated pressures, and that these difficulties could be avoided by reducing the molecular oxygen content of the gas fed to the burner to a level below about 15% by volume. The combustion efficiencies using mixtures of air and inert gas were high and in all cases the percentage of carbon dioxide in the total carbon oxides produced was about 90% or greater.

Although the process of the invention has been described primarily in terms of coal gasification, it should be understood that it is not limited to gasification and may instead be used in other operations. In fluidized bed coal pyrolysis and hydrogen manufacturing operations in which char particles or coke are circulated to a transfer line burner for the combustion of carbon and the generation of heat, for example, ash fusion problems and related difficulties may be encountered. These difficulties can be alleviated by introducing the carbonaceous solids into the lower end of the burner as a dense phase stream containing an inert gas essentially free of molecular oxygen and by injecting an oxygen-containing gas having a molecular oxygen content less than about 15% by volume into the burner near the lower end in a volume sufficient to promote a transition from dense phase to dilute phase flow and the combustion of carbon to produce the required heat as disclosed herein.

I claim:

1. In a process wherein a stream of hot carbonaceous particles is continuously withdrawn from a fluidized bed reaction vessel, circulated upwardly through a transfer line burner for the combustion of a portion of the carbon in said particles, and returned to said fluidized bed reaction vessel, the improvement which comprises introducing said stream of hot particles into the lower end of said transfer line burner as a dense phase stream containing an inert gas essentially free of molecular oxygen and injecting a molecular oxygen-containing gaseous mixture having a molecular oxygen content less than about 15 percent by volume into said burner near the lower end thereof in a quantity sufficient to effect a transition from dense phase to dilute phase flow and promote said combustion of said carbon.

2. A process as defined in claim 1 wherein said gaseous mixture is a mixture of air and flue gas containing from about 1 to about 15 volume percent of molecular oxygen.

3. A process as defined by claim 1 wherein said gaseous mixture contains less than about 10 volume percent of molecular oxygen.

4. A process as defined by claim 1 wherein the wall temperature of said transfer line burner near the point at which said gaseous mixture is injected into the burner is monitored and the molecular oxygen content of said mixture is regulated in response to changes in said temperature.

5. A process as defined by claim 1 wherein said inert gas is a flue gas.

6. A process as defined by claim 1 wherien said fluidized bed reaction vessel is a gasifier containing steam gasification and hydrogasification zones.

7. A process as defined by claim 1 wherein said gaseous mixture is introduced into said transfer line burner at a rate between about 0.025 and about 0.35 pound per pound of char circulated through said burner.

8. A process as defined by claim 1 wherein said carbonaceous particles are introduced into said burner at a temperature in the range between about 1450° and about 1800° F.

9. A process as defined by claim 1 wherein the wall temperature of said transfer line burner near the upper end thereof is monitored and the volume of said gaseous mixture fed to said burner is regulated in response to changes in said temperature.

10. A process as defined in claim 1 wherein the residence time of said carbonaceous particles in said transfer line burner is between about 0.3 and about 5.0 seconds.

* * * * *